US011810330B2

(12) United States Patent
Chen

(10) Patent No.: US 11,810,330 B2
(45) Date of Patent: *Nov. 7, 2023

(54) INFORMATION PROCESSING APPARATUS, INFORMATION PROCESSING METHOD, NON-TRANSITORY COMPUTER-READABLE STORAGE MEDIUM

(71) Applicant: CANON KABUSHIKI KAISHA, Tokyo (JP)

(72) Inventor: Tsewei Chen, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,353

(22) Filed: Aug. 29, 2022

(65) Prior Publication Data

US 2022/0414938 A1 Dec. 29, 2022

Related U.S. Application Data

(63) Continuation of application No. 16/589,483, filed on Oct. 1, 2019, now Pat. No. 11,468,600.

(30) Foreign Application Priority Data

Oct. 3, 2018 (JP) .................................. 2018-188612

(51) Int. Cl.
*G06T 7/00* (2017.01)
*G06F 7/544* (2006.01)
(Continued)

(52) U.S. Cl.
CPC .............. *G06T 7/97* (2017.01); *G06F 7/5443* (2013.01); *G06N 3/04* (2013.01); *G06N 3/063* (2013.01);
(Continued)

(58) Field of Classification Search
CPC ...... G06F 7/5443; G06N 3/04; G06N 3/0454; G06N 3/063; G06T 2207/10016; G06T 2207/20084; G06T 7/97
See application file for complete search history.

(56) References Cited

U.S. PATENT DOCUMENTS 8,706,791 B2 * 4/2014 Jacob (Yaakov) .... G06F 7/5443
708/523
10,861,123 B2 * 12/2020 Chen ......................... G06T 1/20
(Continued)

FOREIGN PATENT DOCUMENTS

JP 2017-079017 A 4/2017
KR 20070058293 A 6/2007
(Continued)

OTHER PUBLICATIONS

Y. Li, et al., A 7.663-TOPS 8.2-W Energy-efficient FPGA Accelerator for Binary Convolutional Neural Networks, Proceedings of the 2017 ACM/SIGDA International Symposium on Field—Programmable Gate Arrays, pp. 290-291, Feb. 2017.
(Continued)

*Primary Examiner* — Bobbak Safaipour
(74) *Attorney, Agent, or Firm* — Venable LLP

(57) ABSTRACT

An information processing apparatus comprises a control unit configured to set a shift amount based on a bit width of data, for each layer of a network including a plurality of layers, a plurality of MAC (multiply-accumulate) units configured to execute MAC operations on a plurality of data and a plurality of filter coefficients of the layer, a plurality of shift operation units configured to shift a plurality of MAC operation results obtained by the plurality of MAC units
(Continued)

based on the shift amount, and an adding unit configured to calculate a total sum of the plurality of MAC operation results shifted by the plurality of shift operation units.

33 Claims, 12 Drawing Sheets

(51) Int. Cl.
*G06N 3/04* (2023.01)
*G06N 3/063* (2023.01)

(52) U.S. Cl.
CPC ............... *G06T 2207/10016* (2013.01); *G06T 2207/20084* (2013.01)

(56) References Cited

U.S. PATENT DOCUMENTS

| | | | | |
|---|---|---|---|---|
| 10,936,939 | B2* | 3/2021 | Tomono | G06N 3/063 |
| 11,468,600 | B2* | 10/2022 | Chen | G06N 3/063 |
| 2009/0232071 | A1* | 9/2009 | Cho | H04L 5/0044 370/329 |
| 2016/0328645 | A1* | 11/2016 | Lin | G06N 3/08 |
| 2017/0116495 | A1* | 4/2017 | Nomura | G06N 3/08 |
| 2018/0341495 | A1* | 11/2018 | Culurciello | G06F 9/30036 |
| 2019/0164043 | A1* | 5/2019 | Litvak | G06F 7/5443 |
| 2020/0065154 | A1* | 2/2020 | Huang | G06N 3/063 |
| 2020/0394516 | A1* | 12/2020 | Chen | G06F 18/2413 |
| 2022/0012856 | A1* | 1/2022 | Chen | G06N 3/063 |

FOREIGN PATENT DOCUMENTS

| | | |
|---|---|---|
| KR | 20140103171 A | 8/2014 |
| KR | 20160102987 A | 8/2016 |
| WO | 2018005030 A1 | 1/2018 |

OTHER PUBLICATIONS

K. Lee, et al., A 502-GOPS and 0.984-mW Dual-Mode Intelligent ADAS SoC With Real-Time Semiglobal Matching and Intention Prediction for Smart Automotive Black Box System, IEEE Journal of Solid-State Circuits, vol. 52, No. 1. pp. 139-150, Jan. 2017.
Korean Office Action dated Jul. 20, 2022 in corresponding Korean Patent Application No. 10-2019-0118500.
Sharma Hardik et al: "Bit Fusion: Bit-Level Dynamically Composable Architecture for Accelerating Deep Neural Network", 2018 ACM/IEEE 45th Annual International Symposium on Computer Architecture (ISCA), IEEE, Jun. 1, 2018, pp. 764-775, XP033375535.
Choi Woong et al: "Low Cost Convolutional Neural Network Accelerator Based on Bi-Directional Filtering and Bit-Width Reduction", IEEE Access, vol. 6, Apr. 4, 2018, pp. 14734-14746, XP011682283.
European Search Report issued in corresponding European Application No. 19197809.7 dated Feb. 28, 2020.
Korean Notice of Allowance dated Sep. 14, 2023 in counterpart Korean Patent Appln. No. 10-2023-0114588.

* cited by examiner

FIG. 6A

| TIME | 0ms | 1ms | 2ms | 3ms | 4ms | 5ms |
|---|---|---|---|---|---|---|
| INPUT FEATURE DATA | (1,1) | (1,2) | (1,3) | (1,4) | | |
| OUTPUT FEATURE DATA | | | | | (2,1) | |

PROCESSING OF 8 BIT DATA

FIG. 6B

| TIME | 0ms | 1ms | 2ms | 3ms | 4ms | 5ms |
|---|---|---|---|---|---|---|
| INPUT FEATURE DATA | (2,1) | (2,1) | (2,1) | (2,1) | | |
| | (2,2) | (2,2) | (2,2) | (2,2) | | |
| | (2,3) | (2,3) | (2,3) | (2,3) | | |
| | (2,4) | (2,4) | (2,4) | (2,4) | | |
| OUTPUT FEATURE DATA | | (3,1) | (3,2) | (3,3) | (3,4) | |

PROCESSING OF 2 BIT DATA

FIG. 6C

| TIME | 0ms | 1ms | 2ms | 3ms | 4ms | 5ms |
|---|---|---|---|---|---|---|
| INPUT FEATURE DATA | (3,1) | (3,3) | (3,3) | (3,3) | | |
| | (3,2) | (3,4) | (3,4) | (3,4) | | |
| OUTPUT FEATURE DATA | | | (4,1) | (3,2) | (4,2) | |

PROCESSING OF 4 BIT DATA

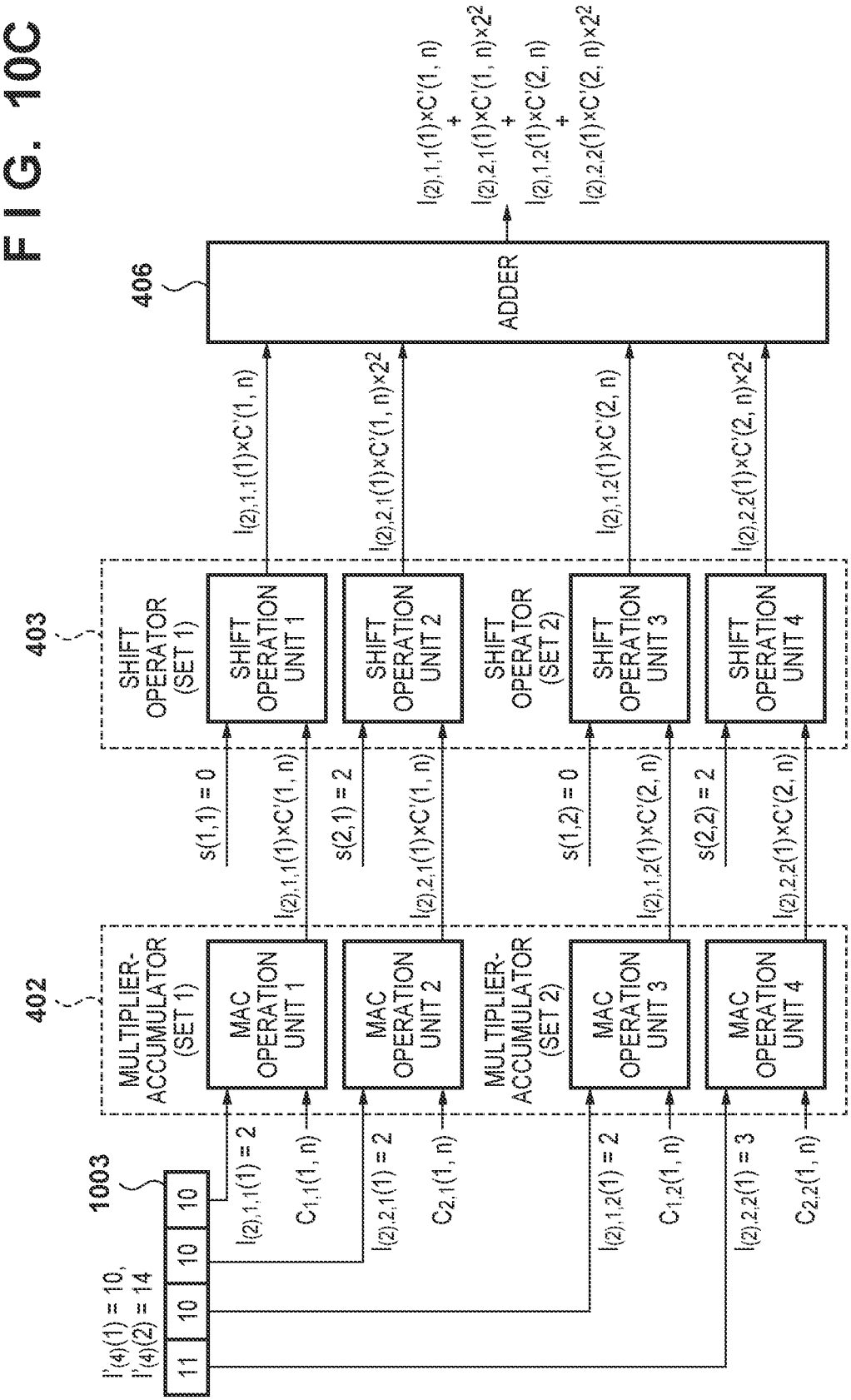

INFORMATION PROCESSING APPARATUS, INFORMATION PROCESSING METHOD, NON-TRANSITORY COMPUTER-READABLE STORAGE MEDIUM

BACKGROUND OF THE INVENTION

Field of the Invention

The present invention relates to an arithmetic technique in a network which has a plurality of layers.

Description of the Related Art

In recent years, due to the advancement of deep learning, the accuracy of image recognition is improving. A convolutional neural network (CNN) is known as a method that is used in deep learning. In CNN, a plurality of layers are hierarchically connected, and a plurality of feature images are included in each layer. FIG. 2 shows an example of a network in which there are four layers (layers 1 to 4) and four feature images in each layer. In FIG. 2, a feature image (i, j) represents a j-th feature image in a layer i. A filter processing result is calculated by using learned filter coefficients and feature image pixels (feature data). The filter processing is a multiply-accumulate (MAC) operation and includes a plurality of multiplications and a cumulative sum. Each arrow shown in FIG. 2 indicates a MAC operation.

Feature images of a current layer are calculated by using feature images of a preceding layer and filter coefficients corresponding to the preceding layer. To calculate one feature image of the current layer, the information of a plurality of feature images of the preceding layer is required. The equation of the convolution operation for calculating each feature image of the current layer is as follows.

$$O_{i,j}(n) = \sum_{m=1}^{M} \sum_{x=0}^{X-1} \sum_{y=0}^{Y-1} (I_{i+x,j+y}(m) \times C_{x,y}(m, n)) \quad (1)$$

where $O_{i,j}(n)$ is a variable representing a MAC operation result corresponding to a position (i, j) in an n-th feature image in the current layer. In equation (1), there are M feature images in the preceding layer, and $I_{i,j}(m)$ represents feature data at the position (i, j) in an m-th feature image. There are X×Y filter coefficients $C_{1,1}(m, n)$ to $C_{X,Y}(m, n)$, and the filter coefficient differs for each feature image. The MAC operations for calculating the n-th feature image in the current layer are performed M×X×Y times. After the convolution operation has been executed, the feature images of the current layer are calculated by executing processing such as activation and pooling by using the MAC operation result $O_{i,j}(n)$.

Since CNN requires a large number of MAC operations, an efficient data parallel processing apparatus is needed when CNN is to be applied to an embedded system such as a mobile terminal, an onboard device, or the like. Since reducing the bit width of the processing date will reduce the cost of an arithmetic operation unit which calculates the convolution operation result, the degree of parallelism (DOP) of the arithmetic operation unit can be increased. A hardware arrangement that processes a network with a different data bit width for each layer is proposed in Y. Li, et al., A 7.663-TOPS 8.2-W Energy-efficient FPGA Accelerator for Binary Convolutional Neural Networks, Proceedings of the 2017 ACM/SIGDA International Symposium on Field-Programmable Gate Arrays, Pages 290-291, February 2017.

In the method described in Y. Li, et al., A 7.663-TOPS 8.2-W Energy-efficient FPGA Accelerator for Binary Convolutional Neural Networks, Proceedings of the 2017 ACM/SIGDA International Symposium on Field-Programmable Gate Arrays, Pages 290-291, February 2017, different kinds of arithmetic operators are used to process a CNN with a different bit width for each layer. In a case in which the bit width of the feature data of an input layer is 8 bits and the bit width of the feature data of an intermediate layer is 2 bits, a convolution operation unit dedicated to 8-bit data and a convolution operation unit dedicated to 2-bit data will be required.

Although the 8-bit data layer and the 2-bit data layer can be processed by pipelining to process data in parallel, the hardware use efficiency is reduced when the calculation amount of the convolution processing differs for each layer. In addition, when feature data having a bit width (such as 4 bits) which is between 2 bits and 8 bits is to be processed, the efficiency will degrade because the convolution operation unit dedicated to 8-bit data will have to be used since there is no convolution operation unit for this bit width.

In the method described in K. Lee, et al., A 502-GOPS and 0.984-mW Dual-Mode Intelligent ADAS SoC With Real-Time Semiglobal Matching and Intention Prediction for Smart Automotive Black Box System, IEEE Journal of Solid-State Circuits, Vol. 52, No. 1, Pages 139-150, January 2017, there is proposed an RNN (Recurrent Neural Network) dedicated hardware having an SIMD (single instruction multiple data) configuration capable of processing feature data sets that have plurality of bit widths. Although 8-bit data, 16-bit data, and 32-bit data can be processed by using the same hardware, this will increase the processing time when the total sum of data output in parallel is to be calculated because an SIMD command will need to be executed once again after the data has been temporarily held in a memory.

SUMMARY OF THE INVENTION

The present invention provides a technique for implementing efficient processing even if there are data sets having a plurality of bit widths in a multilayer network.

According to the first aspect of the present invention, there is provided an information processing apparatus, comprising: a control unit configured to set a shift amount based on a bit width of data, for each layer of a network including a plurality of layers; a plurality of MAC (multiply-accumulate) units configured to execute MAC operations on a plurality of data and a plurality of filter coefficients of the layer; a plurality of shift operation units configured to shift a plurality of MAC operation results obtained by the plurality of MAC units based on the shift amount; and an adding unit configured to calculate a total sum of the plurality of MAC operation results shifted by the plurality of shift operation units.

According to the second aspect of the present invention, there is provided an information processing apparatus, comprising: a control unit configured to set a shift amount based on a bit width of data, for each layer of a network including a plurality of layers; a plurality of shift operation units configured to shift a plurality of data of the layer based on the shift amount; a plurality of MAC units configured to execute MAC operations on a plurality of filter coefficients and the plurality of data shifted by the plurality of shift operation units; and an adding unit configured to calculate a total sum of a plurality of MAC operation results calculated by the plurality of MAC units.

According to the third aspect of the present invention, there is provided an information processing method, the method comprising: setting a shift amount based on a bit width of data, for each layer of a network including a plurality of layers; executing MAC operations on a plurality of data and a plurality of filter coefficients of the layer; shifting results of a plurality of the MAC operation based on the shift amount; and calculating a total sum of the plurality of MAC operation results shifted.

According to the fourth aspect of the present invention, there is provided an information processing method, the method comprising: setting a shift amount based on a bit width of data, for each layer of a network including a plurality of layers; shifting a plurality of data of the layer based on the shift amount; executing MAC operations on a plurality of filter coefficients and the plurality of data shifted; and calculating a total sum of a plurality of MAC operation results calculated.

According to the fifth aspect of the present invention, there is provided a non-transitory computer-readable storage medium storing a computer program for causing a computer to function as a control unit configured to set a shift amount based on a bit width of data, for each layer of a network including a plurality of layers; a plurality of MAC units configured to execute MAC operations on a plurality of data and a plurality of filter coefficients of the layer; a plurality of shift operation units configured to shift a plurality of MAC operation results obtained by the plurality of MAC units based on the shift amount; and an adding unit configured to calculate a total sum of the plurality of MAC operation results shifted by the plurality of shift operation units.

According to the sixth aspect of the present invention, there is provided a non-transitory computer-readable storage medium storing a computer program for causing a computer to function as a control unit configured to set a shift amount based on a bit width of data, for each layer of a network including a plurality of layers; a plurality of shift operation units configured to shift a plurality of data of the layer based on the shift amount; a plurality of MAC units configured to execute MAC operations on a plurality of filter coefficients and the plurality of data shifted by the plurality of shift operation units; and an adding unit configured to calculate a total sum of a plurality of MAC operation results calculated by the plurality of MAC units.

Further features of the present invention will become apparent from the following description of exemplary embodiments (with reference to the attached drawings).

BRIEF DESCRIPTION OF THE DRAWINGS

FIGS. 6A to 6C are tables showing the relationship between data and processing times;

FIGS. 10A to 10C are views showing examples of 8-bit feature data, 2-bit feature data, and 4-bit feature data, respectively.

DESCRIPTION OF THE EMBODIMENTS

Figure 1:
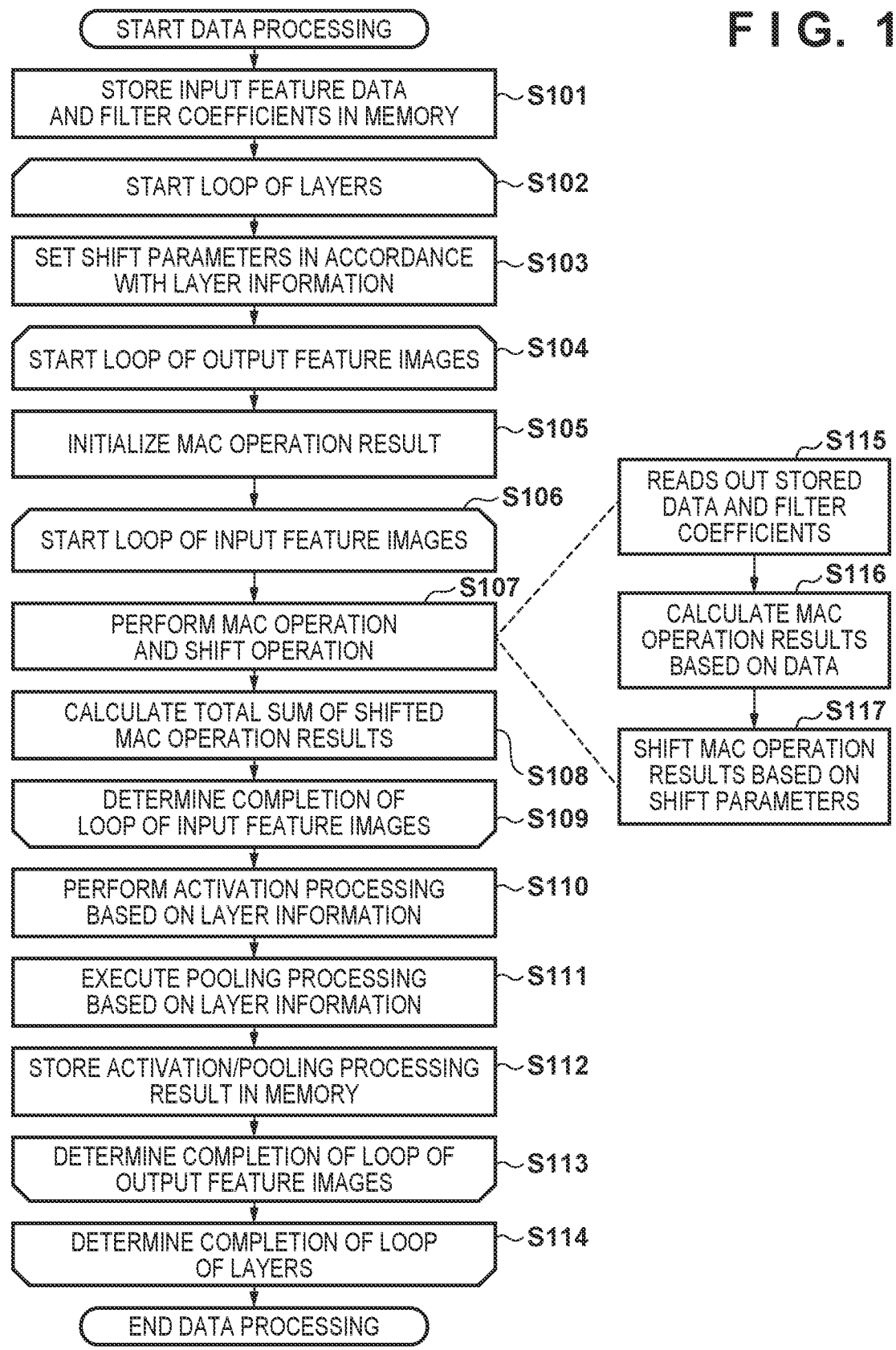
FIG. 1 is a flowchart of data processing.

Embodiments of the present invention will now be described with reference to the accompanying drawings. Note that each embodiment to be described below is an example of detailed implementation of the present invention and is a detailed embodiment of the arrangement described in the appended claims.

First Embodiment

An example of the hardware arrangement of an information processing apparatus according to the embodiment will be described first with reference to the block diagram of FIG. 3. A computer apparatus such as a PC (personal computer), a tablet terminal device, a smartphone, or the like is applicable as the information processing apparatus. In addition, this information processing apparatus may be an embedded device which is to be embedded in such devices.

An input unit 301 is formed by a user interface such as a keyboard, a mouse, a touch panel, or the like, and can input various kinds of instructions to a CPU 306 when operated by a user.

A data storage unit 302 is a large-capacity information storage device such as a hard disk drive device or the like. The data storage unit 302 stores various kinds of information to be used in the information processing apparatus such as an OS (Operating System), various kinds of computer programs executed by the CPU 306, data to be used when the CPU 306 executes various kinds of processing, and the like. The data stored in the data storage unit 302 include images to be processed by an image processing unit 309. Note that information to be described below as "known information" is also stored in the data storage unit 302. The computer programs and data stored in the data storage unit 302 are loaded to a RAM 308 or the like by the CPU 306, a data processing unit 305, and the image processing unit 309 and become processing targets of the CPU 306, a data processing unit 305, and the image processing unit 309.

Note that the data storage unit 302 may be a storage medium (for example, a flexible disk, a CD-ROM, a CD-R, a DVD, a memory card, a CF card, a smart media, an SD card, a memory stick, an xD picture card, a USB memory, or the like). In this case, the information processing apparatus needs to include a device to read out and write the information from/to such a storage medium.

A communication unit 303 functions as a communication interface for performing data communication with an external device. It may be set so that the communication unit 303 will obtain information necessary for executing processing in the information processing apparatus from an external device. The communication unit 303 may transmit the result of the processing performed by the information processing apparatus to an external device.

A display unit 304 is formed by a liquid-crystal screen or a touch panel screen, and can display images, characters, and the like to display a processing result obtained by the CPU 306, the data processing unit 305, or the image processing unit 309. Note that the display unit 304 may be a projection device such as a projector. The input unit 301 and the display unit 304 may be integrated and form a device, such as a touch screen device, which has both an instruction input accepting function and a display function.

The data processing unit 305 executes CNN calculation by executing processing in accordance with the flowchart of FIG. 1 by using an image written into the RAM 308 by the image processing unit 309, and outputs the obtained calculation result to the data storage unit 302, the RAM 308, or the like. Note that an image which is to be a processing target of the data processing unit 305 is not limited to an image written into the RAM 308 by the image processing unit 309 and may be, for example, an image input by another apparatus. The data processing unit 305 will be described later with reference to FIG. 4.

The CPU 306 executes various kinds of processing by using computer programs and data stored in a ROM 307 or the RAM 308. This allows the CPU 306 to control the overall operation of the information processing apparatus.

The ROM 307 stores information that need not be rewritten such as setting data, an activation program, and the like of the information processing apparatus. The RAM 308 includes an area for storing computer programs and data loaded from the data storage unit 302 and the ROM 307, information received by the communication unit 303 from an external device, and the like. The RAM 308 includes a work area used by the CPU 306, the data processing unit 305, and the image processing unit 309 to execute various kinds of processing. The RAM 308 can appropriately provide various kinds of areas in this manner.

The image processing unit 309 reads out an image stored in the data storage unit 302 and writes the image in the RAM 308 after executing pixel value range adjustment on each pixel of the image under the instruction from the CPU 306.

The input unit 301, the data storage unit 302, the communication unit 303, the display unit 304, the data processing unit 305, the CPU 306, the ROM 307, the RAM 308, and the image processing unit 309 described above are all connected to a bus 310.

Figure 3:
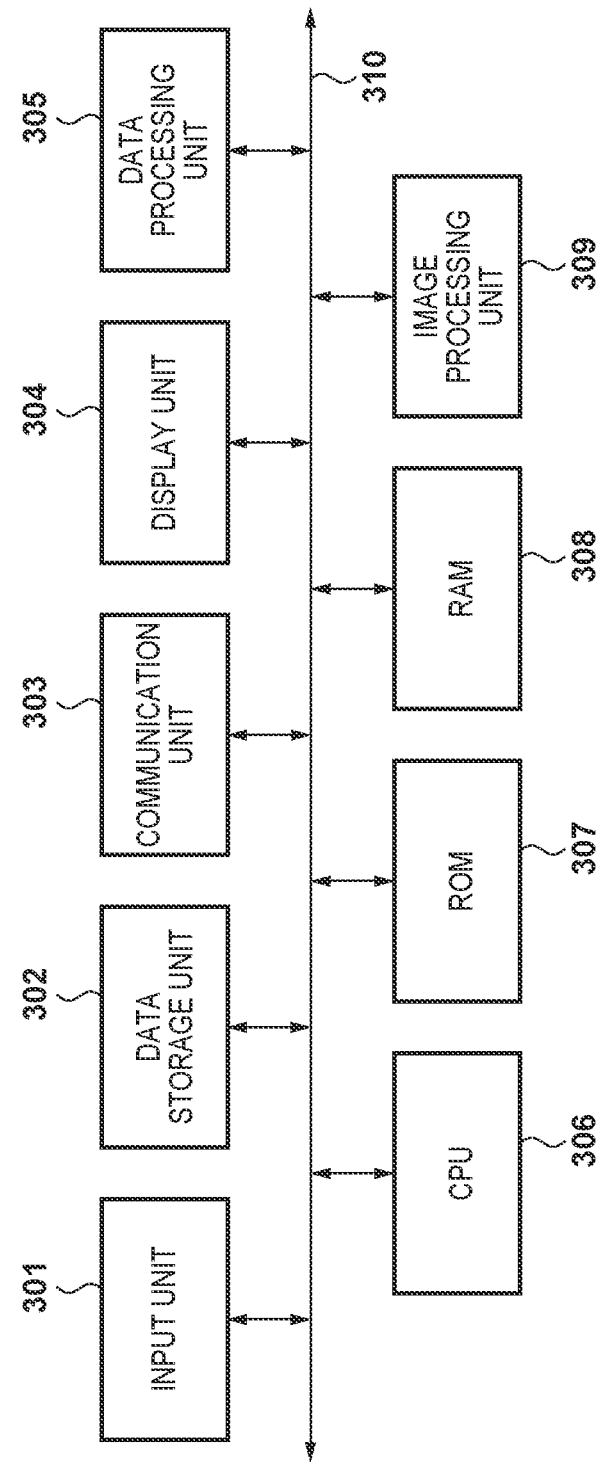
FIG. 3 is a block diagram showing an example of the hardware arrangement of an information processing apparatus.

Note that the hardware arrangement of the information processing apparatus is not limited the arrangement shown in FIG. 3. For example, the arrangement of FIG. 3 may be implemented by a plurality of apparatuses. In addition, the information processing apparatus need not always include devices such as the input unit 301, the data storage unit 302, and the display unit 304, and it may be set so that these devices will be connected to the information processing apparatus via a communication path.

In addition, some or all of the pieces of information described as being stored in the RAM 308 may be stored in the data storage unit 302, and some or all of the pieces of information described as being stored in the data storage unit 302 may be stored in the RAM 308. Alternatively, it may be set so that a part of the RAM 308 will be used as the data storage unit 302 or it may be virtually arranged so that storage device of a communication partner device of the communication unit 303 will be used as the data storage unit via the communication unit 303.

Also, although only one CPU 306 is shown in FIG. 3, the number of CPU 306 included in the information processing apparatus is not limited to one, and a plurality of CPUs may be included in the information processing apparatus. In addition, the data processing unit 305 and the image processing unit 309 may be implemented as hardware or may be implemented as computer programs. In the case of the latter, these computer programs will be stored in the data storage unit 302, and the functions of the data processing unit 305 and the image processing unit 309 will be executed by the CPU 306 executing the corresponding computer programs.

Note that based on the processing result of the data processing unit 305, the CPU 306 will perform image processing and/or image recognition on each frame of a moving image obtained from the communication unit 303 or the data storage unit 302. The result of the image processing or image recognition by the CPU 306 is stored in the RAM 308 or the data storage unit 302 or output to an external device via the communication unit 303. Also, the result of the image processing or image recognition by the CPU 306 may be displayed as an image or characters on the display unit 304 or output as audio if the information processing apparatus has an audio output function.

<Processing Target Network>

Figure 2:
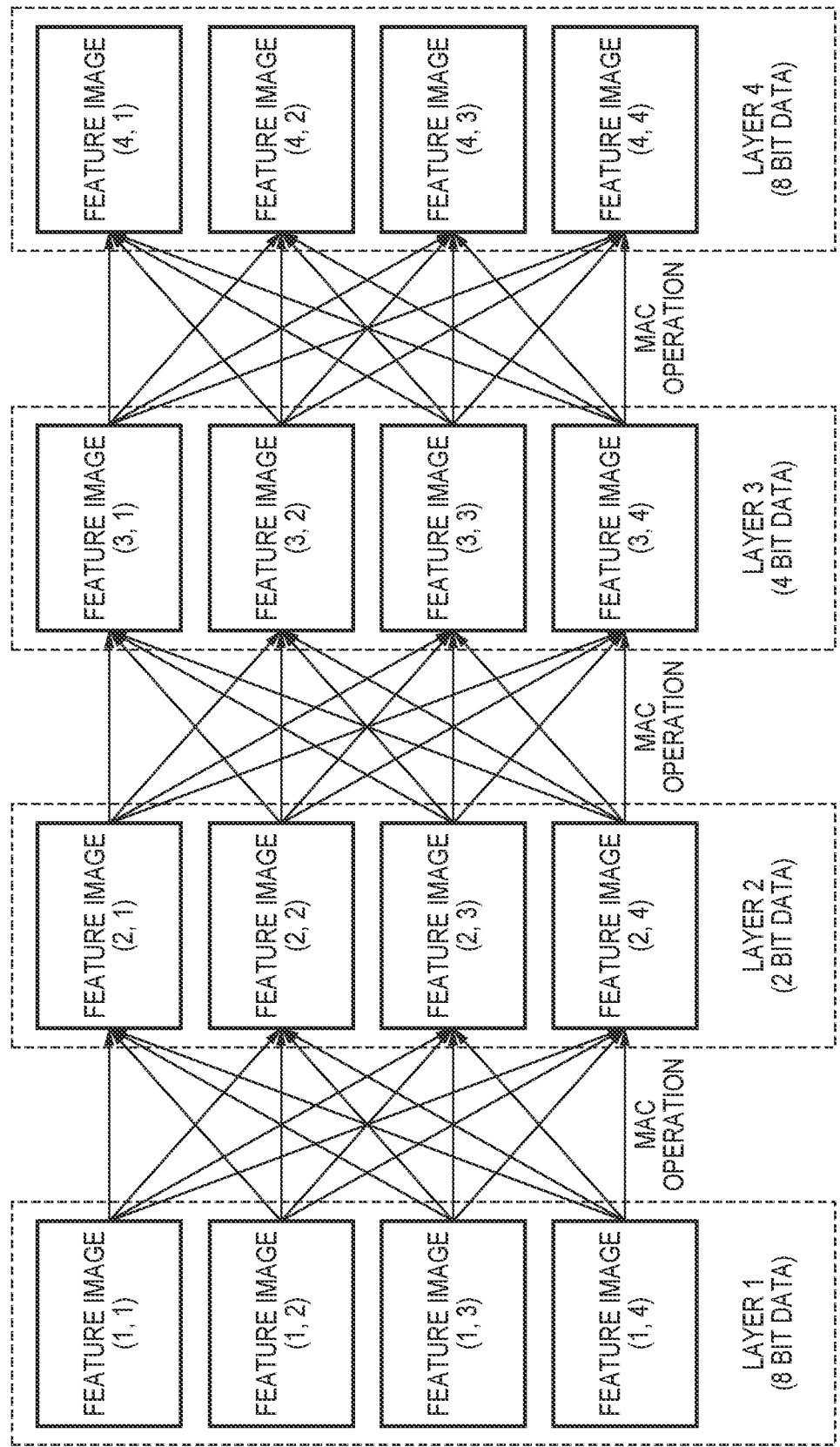
FIG. 2 is a view showing an example of the arrangement of a processing-target network.

This embodiment uses CNN as the processing target network. FIG. 2 shows an example of the arrangement of the processing target network. The details of the processing target network of FIG. 2 are as described above. Note that pieces of information such as the calculation amount of each MAC operation, the size of each feature image, the number of feature images, the number of bits of each feature image, and the like of the processing target network are stored in the data storage unit 302 or the like.

The number of layers in the processing target layer network shown in FIG. 2 is four (layers 1 to 4), and there are four feature images in each layer. As described above, a feature image (i, j) represents a j-th feature image of a layer i. Also, the bit width of each feature image of a layer changes depending on the layer. The bit width of each feature image of the layer 1 is 8 bits, the bit width of each feature image of the layer 2 is 2 bits, the bit width of each feature image of the layer 3 is 4 bits, and the bit width of each feature image of the layer 4 is 8 bits. Since the first layer (layer 1) and the final layer (layer 4) hold input/output image information, the bit widths (8 bits) of the first layer and the final layer tend to be larger than the bit widths (2 bits and 4 bits) of intermediate layers (layer 2 and layer 3). Each feature image is formed by a plurality of pixels (feature data).

The calculation (generation) of feature images of each of the layers 1 to 4 executed by the data processing unit 305 will be described hereinafter. MAC operations according to equation (1) described above are executed by using filter coefficients and 8-bit feature images (1, 1), (1, 2), (1, 3), and (1, 4) of the layer 1. Subsequently, 2-bit feature images (2, 1), (2, 2), (2, 3), and (2, 4) of the layer 2 are generated as a result of the MAC operations.

Next, the 2-bit feature images (2, 1), (2, 2), (2, 3), and (2, 4) of the layer 2 and the filter coefficients are used to perform MAC operations in accordance with equation (1) described above. Subsequently, 4-bit feature images (3, 1), (3, 2), (3, 3), and (3, 4) of the layer 3 are generated as a result of the MAC operations.

Next, the 4-bit feature images (3, 1), (3, 2), (3, 3), and (3, 4) of the layer 3 and the filter coefficients are used to perform MAC operations in accordance with equation (1) described above. Subsequently, 8-bit feature images (4, 1), (4, 2), (4, 3), and (4, 4) of the layer 4 are generated as a result of the MAC operations.

<Arrangement Example of Data Processing Unit 305>

Figure 4:
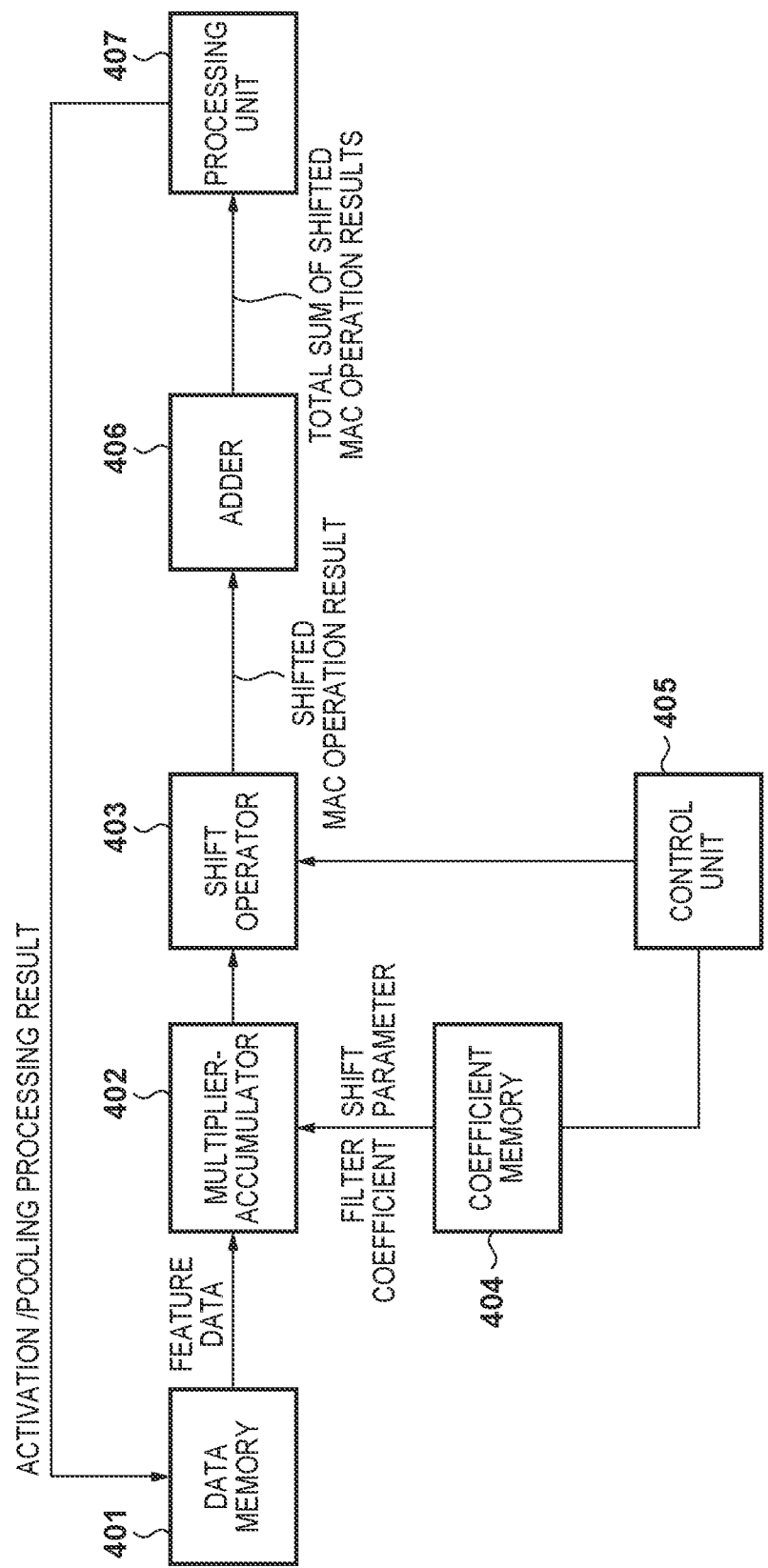
FIG. 4 is a block diagram showing an example of the arrangement of a data processing unit 305.

An example of the arrangement of the data processing unit 305 is shown in FIG. 4. A data memory 401 holds the feature data of each feature image of each layer, and a coefficient memory 404 holds the filter coefficients. A multiplier-accumulator 402 calculates each MAC operation result by executing a MAC operation by using the filter coefficients held in the coefficient memory 404 and the feature data held in the data memory 401. A shift operator 403 shifts each MAC operation result obtained by the multiplier-accumulator 402, and an adder 406 obtains "a total sum of the shifted MAC operation results" by adding the plurality of shifted MAC operation results. Based on "the total sum of the shifted MAC operation results" obtained by the adder 406, a processing unit 407 calculates an activation/pooling processing result and stores the calculated activation/pooling processing result in the data memory 401. A control unit 405 controls the overall operation of the data processing unit 305.

The data processing by the data processing unit 305 will be described in accordance with the flowchart of FIG. 1. In step S101, the control unit 405 reads out feature data of a plurality of input feature images and the filter coefficients from the RAM 308, stores the read-out feature data in the data memory 401, and stores the read-out feature coefficients in the coefficient memory 404.

In step S102, the control unit 405 starts the loop of the layers and sets one of the unprocessed layers as the processing target layer. Since the layers 1 to 4 will be set sequentially as a processing target in this example, the layer 1 will be the processing target layer first.

In step S103, the control unit 405 sets the shift parameters, defining shift amounts, of the shift operator 403 in accordance with the layer information. In step S104, the control unit 405 starts the loop of the output feature images and sequentially calculates the output feature data. In step S105, the control unit 405 initializes the MAC operation result stored in the adder 406 to set the MAC operation result to zero. The adder 406 has a total sum calculation function.

In step S106, the control unit 405 starts the loop of input feature images and sequentially processes the input feature data. In step S107, under the control of the control unit 405, the multiplier-accumulator 402 and the shift operator 403 perform the MAC operation and the shift operation, respectively, described above. The details (step S115 to step S117) of the process of step S107 will be described later.

In step S108, the adder 406 adds the plurality of MAC operation results to obtain "the total sum of the shifted MAC operation results". In step S109, the control unit 405 determines the completion of the input feature image loop. If the processing of all of the input feature images has been completed, the process advances to step S110. Otherwise, the process returns to step S107, and the processing of the next unprocessed input feature image is started. In step S110, the processing unit 407 calculates an activation processing result based on "the total sum of the shifted MAC operation results" obtained by the adder 406 in accordance with $$f(x) = \begin{cases} 0, & x < 0 \\ x, & x \geq 0 \end{cases} \quad (2)$$

In this case, f( ✖ ) is an activation function, and x is input data. Although ReLU (Rectified Linear Unit) is used to implement the activation function in this example, the present invention is not limited to ReLU, and the activation function may be implemented by another non-linear function or a quantization function. Note that the bit width of the activation processing result will be adjusted as needed.

In step S111, the processing unit 407 calculates the activation/pooling processing result by executing pooling processing based on the activation processing result in accordance with the layer information. In step S112, the processing unit 407 stores the activation/pooling processing result calculated in step S11 as a feature image of the next layer in the data memory 401.

In step S113, the control unit 405 determines the completion of the loop of the output feature images. If the processing of all of the output feature images has been completed, the process advances to step S114. Otherwise, the process returns to step S105 to start the processing of an unprocessed output feature image.

In step S114, the control unit 405 determines the completion of the loop of the layers. If the processing of all of the layers has been completed, the processing according to the flowchart of FIG. 1 ends. Otherwise, the process returns to step S103, and the processing of an unprocessed layer is started.

<MAC Operation and Shift Operation>

The MAC operation and the shift operation (steps S115 to S117) of step S107 will be described. In step S115, in addition to reading out the feature data from the data memory 401 and transferring the read-out feature data to the multiplier-accumulator 402, the control unit 405 reads out the filter coefficients from the coefficient memory 404 and transfers the read-out filter coefficients to the multiplier-accumulator 402. The number of the filter coefficients and the transfer count will vary depending on the bit widths of the feature data.

In step S116, the multiplier-accumulator 402 calculates the MAC operation results based on the feature data and the filter coefficients. In step S117, the shift operator 403 shifts the MAC operation results obtained in step S116 based on the shift amounts indicated by the shift parameters set in step S103.

<Detailed Description of Case with Different Bit Widths>

Figure 10A:
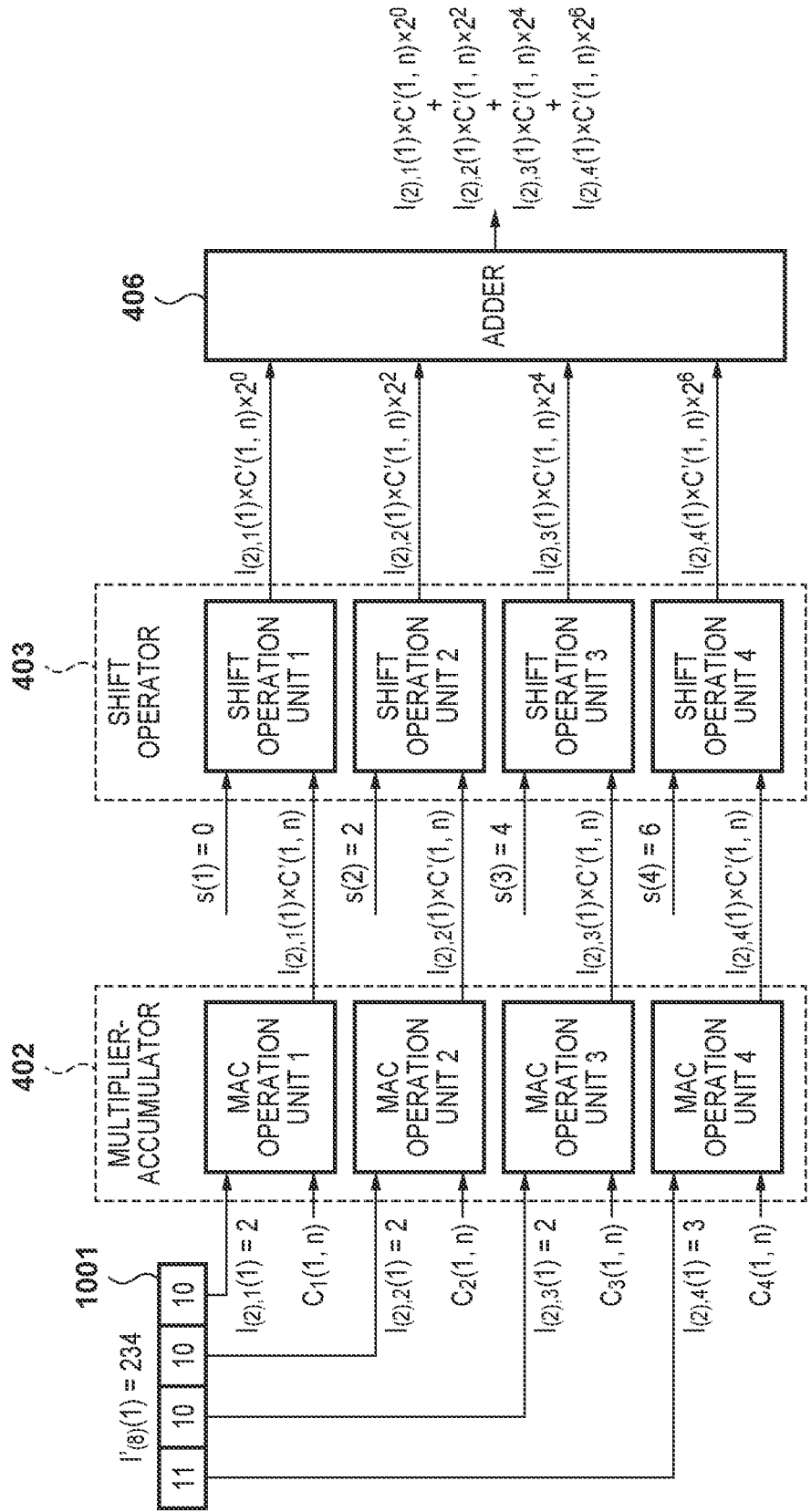
Figure 10B:
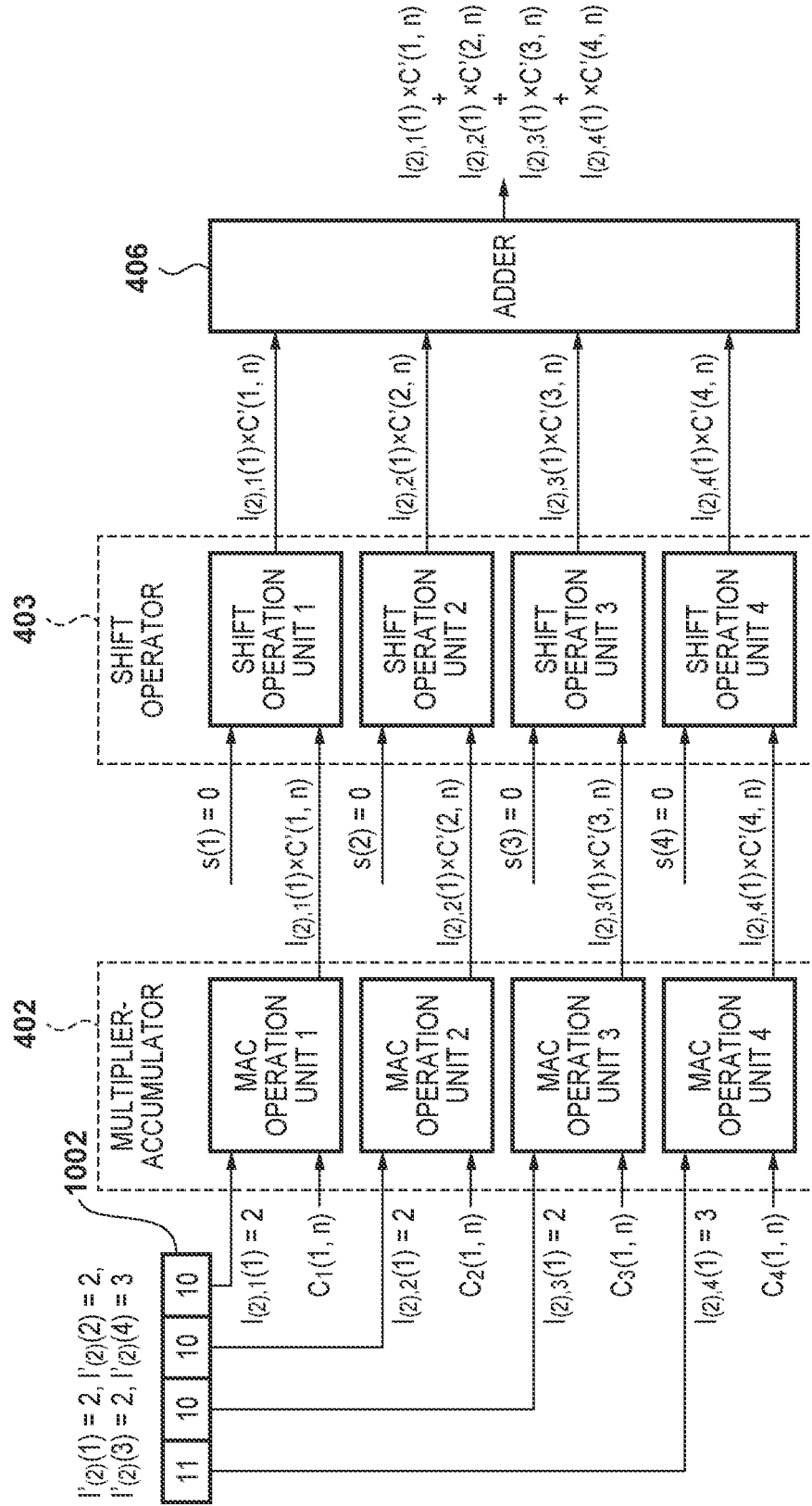

This embodiment can process data of different bit widths. FIG. 10A shows the operations of the multiplier-accumulator 402, the shift operator 403, and adder 406 in a case in which 8-bit feature data is to be processed. FIG. 10B shows the operations of the multiplier-accumulator 402, the shift operator 403, and adder 406 in a case in which 2-bit feature data is to be processed.

In a case in which the feature data is 8 bits, the multiplier-accumulator 402 divides the 8-bit feature data 1001 (value: 234) into sets of data of 2 bits (2-bit data) as shown in FIG. 10A. The multiplier-accumulator 402 uses the four sets of 2-bit data (values: 2, 2, 2, 3) obtained from the division and a shared filter coefficient to calculate four MAC operation results, and the shift operator 403 shifts the four MAC operation results based on four shift parameters. Subsequently, the adder 406 adds the four shifted MAC operation results to calculate one set of feature data (the MAC operation results of 8-bit input feature data). The data processing unit 305 can process one set of 8-bit input feature data in this manner.

In a case in which the feature data is 2 bits, the multiplier-accumulator 402 uses the four sets of 2-bit data 1002 (values: 2, 2, 2, 3) and four filter coefficients to calculate four MAC operation results as shown in FIG. 10B. The shift operator 403 shifts the four MAC operation results based on one shift parameter. Since the shift parameter is zero, the states of the MAC operation results are the same before and after the shift operation. Subsequently, the adder 406 calculates one set of feature data (the total sum of the MAC operation results of the four 2-bit input feature data sets) by adding the four MAC operation results. The data processing unit 305 can process the four sets of 2-bit input feature data in parallel in this manner.

Let M be the number of input feature images and 1×1 be the filter size. Since the filter size equal to one pixel, and the values of variables x and y are constants. $O_{i,j}(n)$ will be calculated by using $I_{i,j}(n)$. The calculation (equation 1) of the MAC operation can be simplified as $$O(n) = \sum_{m=1}^{M}(I(m) \times C(m, n)) \qquad (3)$$

Although the multiplier-accumulator 402 will calculate each convolution result of the filter coefficients and the input feature data in a case in which the filter size is more than 1×1, the multiplier-accumulator 402 will calculate the product of I(m) and C(m, n) in a case in which the filter size is equal to 1×1.

Assume that there are two kinds of feature processing target data, feature processing data whose bit width is α bits and feature processing data whose bit width is β bits. The multiplier-accumulator 402 shown in FIG. 4 includes P α-bit data MAC operation units for calculating the MAC operation results, and the shift operator 403 includes P α-bit data shift operation units for calculating the shift operation results. α, β, and P satisfy the following condition.

$$\beta = \alpha \times P \qquad (4)$$

In a case in which the bit width of input feature data $I'_{(\beta)}$ is β bits, the output of the adder 406 is represented as equation (5) below based on the premise of equations (6), (7), and (8). A MAC operation result O(n) of the n-th output image is given by $$O(n) = \sum_{m=1}^{M}\sum_{p=1}^{P}\left[(I_{(\alpha),p}(m) \times C_p(m, n)) \times 2^{S(p)}\right] \qquad (5)$$

where $I_{(\alpha), p}(m)$ is input data of the α-bit data MAC operation unit, $C_p(m, n)$ is a filter coefficient, and S(p) is a shift parameter. A variable m is the number (processing number of the multiplier-accumulator 402) of an α-bit input feature image group (1 group=P images), a variable p is the MAC operation unit number and the shift operation unit number, and a variable n is the output feature image number. The shift operation is expressed by processing by the power of 2.

The filter coefficient $C_p(m, n)$ is, as shown in equation (6), a filter coefficient C'(m, n) corresponding to an m-th β-bit feature image. Since a shared filter coefficient is used for the α-bit input feature image group, the variable p can be omitted. The number of filter coefficients to be supplied in parallel to the P MAC operation units is 1, and the transfer count is 1.

$$C_p(m,n)=C(m,n) \qquad (6)$$

In this case, the input data Po is divided into P sets of α-bit data $I_{(\alpha), p}(m)$. The value of the shift parameter S(p) is calculated based on the MAC operation unit number p and the bit width α of the divided data by $$S(p)=\alpha \times (p-1) \qquad (7)$$

The β-bit input feature data $I'_{(\beta)}$ is represented by the divided P sets of α-bit data $I_{(\alpha), p}(m)$ as $$\sum_{p=1}^{P} I_{(\alpha),p}(m) \times 2^{S(p)} = I_{(\beta)}(m) \qquad (8)$$

In this case, a substitution of equations (6), (7), and (8) into equation (5) yields the equation of the output data O(n) as $$O(n) = \sum_{m=1}^{M}\sum_{p=1}^{P}\left[(I_{(\alpha),p}(m) \times C_p(m, n)) \times 2^{\alpha \times (p-1)}\right] = \sum_{m=1}^{M}(i_{(\beta)}(m) \times \hat{C}(m, n)). \qquad (9)$$

On the other hand, in a case in which the bit width of input feature data $I'_{(\alpha)}$ is α bits, the output of the adder 406 is represented as equation (10) below based on the premise of equations (11), (12), and (13). The MAC operation result O(n) of the n-th output image is given by $$O(n) = \sum_{m=1}^{\frac{M}{P}}\sum_{p=1}^{P}\left[(I_{(\alpha),p}(m) \times C_p(m, n)) \times 2^{S(p)}\right] \qquad (10)$$

where $I_{(\alpha), p}(m)$ is the input data of the a-bit data MAC operation unit, $C_p(m, n)$ is the filter coefficient, and S(p) is the shift parameter. The variable m is the number (the processing number of the multiplier-accumulator 402) of the α-bit input feature image group (1 group=P images), the variable p is the MAC operation unit number and the shift operation unit number, and the variable n is the output feature image number. The shift operation is expressed by processing by the power of 2.

The filter coefficient $C_p(m, n)$ is a filter coefficient C'((m−1)×P+p, n) corresponding to an {(m−1)×P+p}-th α-bit feature image. Since the filter coefficient differs depending on the MAC operation unit number p, the number of filter coefficients to be supplied in parallel to the P MAC operation units is P, and the transfer count is P.

$$C_p(m,n)=\hat{C}((m-1)\times P+p,n) \qquad (11)$$

The input feature data becomes the input data $I_{(\alpha), p}(m)$ of the α-bit data MAC operation unit, and the value of the shift parameter S(p) is constantly 0 as shown by $$S(p)=0 \qquad (12)$$

Although the P sets of the α-bit input feature data $I'_{(\alpha)}$ are directly input to the MAC operation units, the P sets of input data are feature data of different feature images. The feature image number is expressed as shown in equation (13) below by the MAC operation unit number p, the number P of shift operation units, and the processing number m of the multiplier-accumulator 402.

$$I_{(\alpha),p}(m)=I_{(\alpha)}((m-1)\times P+p) \qquad (13)$$

A substitution of equations (11), (12), and (13) into equation (10) yields the equation of the output data O(n) as $$O(n) = \sum_{m=1}^{\frac{M}{P}}\sum_{p=1}^{P}\left[\hat{I}_{(\alpha),p}((m-1)\times P + p) \times \hat{C}((m-1)\times P + p, n)\right] \qquad (14)$$

By changing the value of the shift parameter S(p) and the number of filter coefficients, the feature data $I'_{(\alpha)}$ whose bit width is α bits and the feature data $I'_{(\beta)}$ whose bit width is β bits can be processed by using the same operators (the multiplier-accumulator 402, the shift operator 403, and the adder 406).

<Processing Example of Case with Different Bit Widths>

Figure 5:
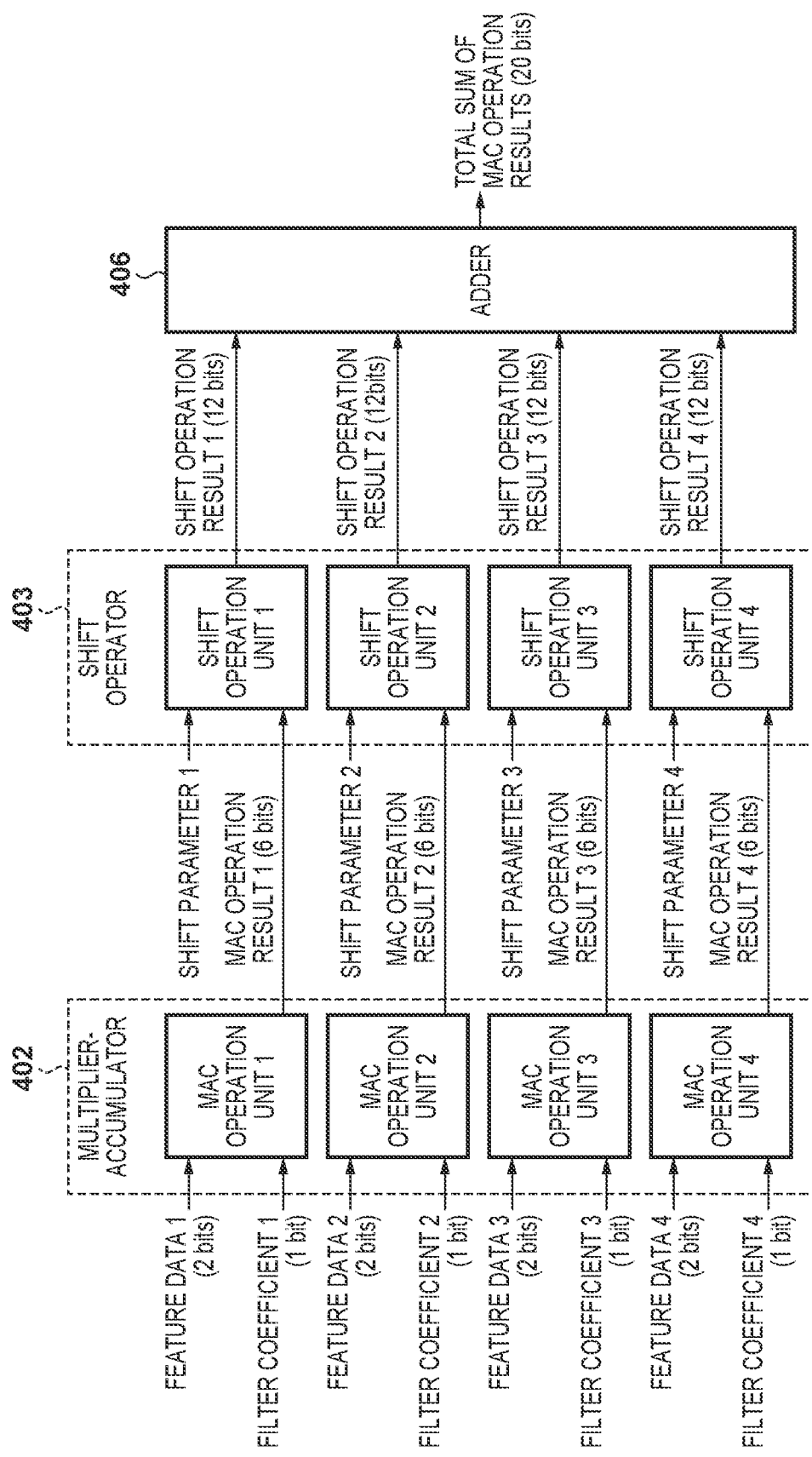
FIG. 5 is a block diagram showing an example of the arrangement of a multiplier-accumulator 402 and a shift operator 403.

FIG. 5 and FIGS. 10A and 10B show an example of an arrangement when P=4, β=8, and α=2. The bit width of input data for the multiplier-accumulator 402 is 2 bits, the bit width of the input data for the shift operator 403 is 6 bits, and the bit width of the input data for the adder 406 is 12 bits.

FIGS. 6A to 6C show an example of the processing time of a case in which the processing target network shown in FIG. 2 is processed by using the hardware arrangement shown in FIG. 5. FIGS. 6A and 10A show an example of when the layer 1 (8-bit data, the number M of input feature images=4) is processed. Feature data $I'_{(8)}(1)$ of the feature image (1, 1) is 8 bits, and four sets of data $I_{(2),1}(1)$ to $I_{(2),4}(1)$ obtained by dividing the feature data by four based on equation (8) are input to the multiplier-accumulator 402. Shift operation results are calculated by using the input feature data sets, the shift parameters, and the filter coefficient C(m, n), the calculated shift operation results are input to the adder 406, and an initial value of zero is added to the obtained result. The calculation result is set as the shift operation result and held by the adder 406. The duration of this process is 1 ms.

Feature data $I'_{(8)}(2)$ of the feature image (1, 2) is 8 bits, and four sets of data $I_{(2), 1}(2)$ to $I_{(2), 4}(2)$ obtained by dividing the feature data by four based on equation (8) are input to the multiplier-accumulator 402. Shift operation results are calculated by using the input feature data sets, the shift parameters, and the filter coefficient C(m, n), and the calculated shift operation results are input to the adder 406 and added to the previous result. The duration of this process is 1 ms.

The feature images (1, 3) and (1, 4) are sequentially processed in a manner similar to the feature image (1, 2), the shift operation results are accumulated, and the addition result is calculated. The duration of the process is 2 ms. Finally, the feature data of the feature image (2, 1) is output via the processing unit 407. The processing time of the four feature images is 4 ms.

FIGS. 6B and 10B show an example of when the layer 2 (2-bit data, the number M of input feature images=4) is processed. Each set of feature data $I'_{(2)}(1)$ to $I'_{(2)}(4)$ of the feature images (2, 1) to (2,4) is 2 bits, and the four sets of data $I_{(2), 1}(1)$ to $I_{(2), 4}(1)$ are input in parallel to the multiplier-accumulator 402 based on equation (13). The shift operation results are calculated by using the input feature data, the shift parameter, and the filter coefficient Cp (m, n), the obtained results are input to the adder 406 and added with the initial value of zero, and the calculation result becomes the shift operation result. Finally, the feature data of the feature image (3, 1) is output via the processing unit 407. The processing time of the four feature images is 1 ms.

As shown in FIGS. 6A and 6B and FIGS. 10A and 10B, the processing time per output data is 4 ms when the input feature data is 8 bits, and the processing time per output data is 1 ms when the input feature data is 2 bits. Data of different bit widths can be processed efficiently by the common data processing unit 305.

Second Embodiment

Differences from the first embodiment will be described below. Matters not particularly mentioned below are similar to those of the first embodiment.

<Order of Shift Operation and MAC Operation>

Figure 9:
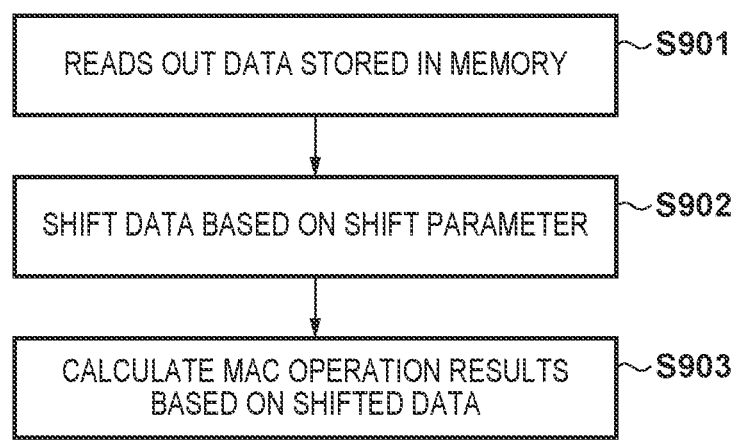
FIG. 9 is a flowchart of data processing.

The first embodiment described an example in which the shift operation is performed after the MAC operation. However, the same processing result can be obtained even if the order of the MAC operation and the shift operation is switched. A part of the flowchart of FIG. 1 will change when the order of the MAC operation and the shift operation is switched. Step S107 changes to steps S901 to S903 in FIG. 9.

Figure 7:
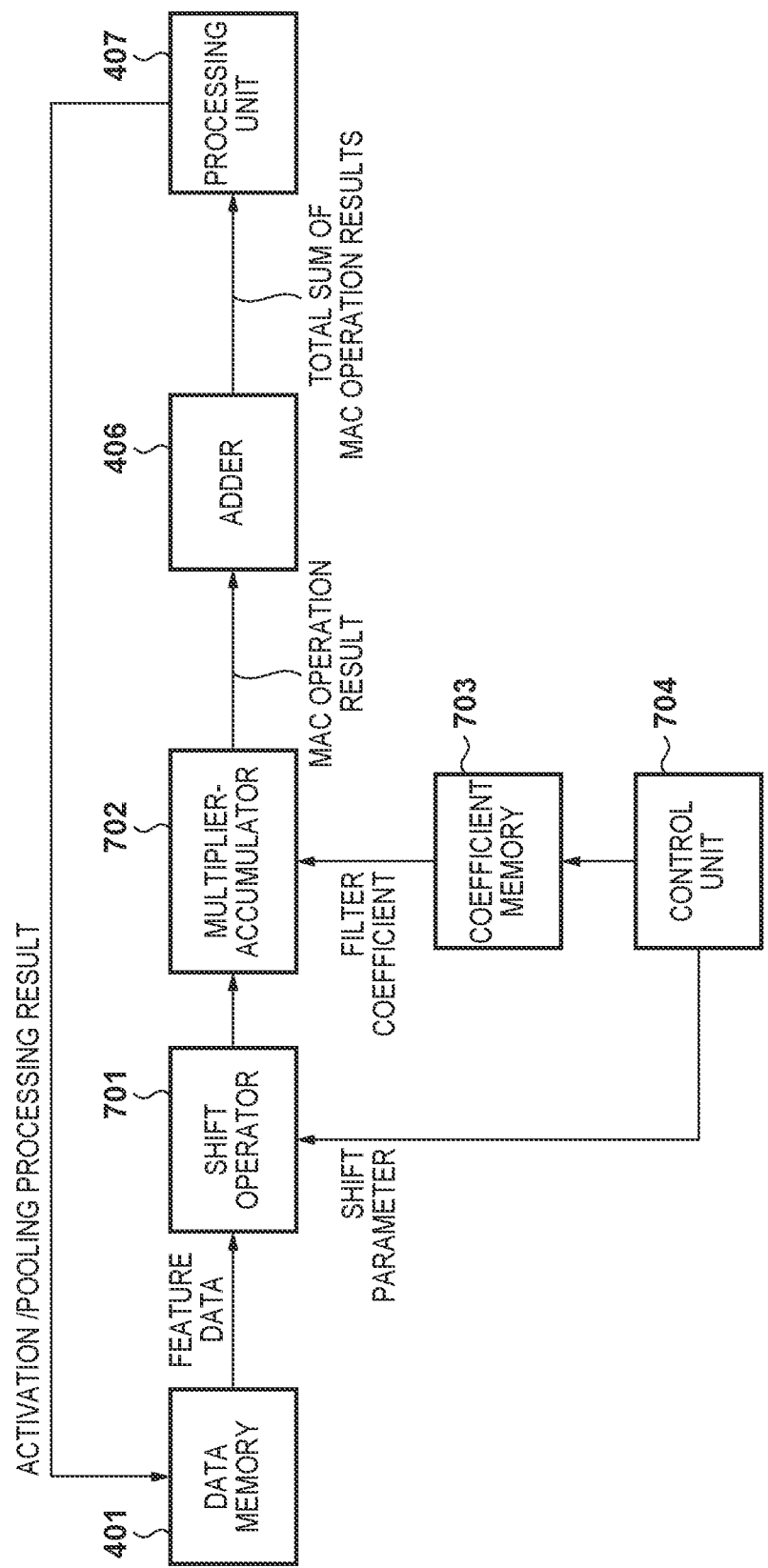
FIG. 7 is a block diagram showing an example of the arrangement of a data processing unit 305.

FIG. 7 shows an example of the arrangement of a data processing unit 305 according to this embodiment. A shift operator 701 shifts the feature data stored in a data memory 401 based on a shift parameter, and the multiplier-accumulator 702 calculates the MAC operation results based on the shifted feature data and the filter coefficient.

<Shift Operation and MAC Operation>

The MAC operation and the shift operation (steps S901 to S903) performed in step S107 will be described. In step S901, a control unit 704 reads out feature data from the data memory 401 and reads out a filter coefficient from a coefficient memory 703. In step S902, the shift operator 701 shifts the feature data based on the shift parameter set in step S103. In step S903, the multiplier-accumulator 702 calculates the MAC operation results based on the shifted feature data and the filter coefficient.

<Detailed Description of Case with Different Bit Widths>

In this embodiment, the shift operator 701 includes P α-bit data shift operation units for calculating shift operation results, and the multiplier-accumulator 702 includes P α-bit data MAC operation units for calculating MAC operation results. The output of the multiplier-accumulator 702 is represented by equation (15) below and is equivalent to the output of a shift operator 403 shown in equation (5).

$$O(n) = \sum_{m=1}^{M} \sum_{p=1}^{P} \left[ \left( I_{(\alpha),p}(m) \times 2^{S(p)} \right) \times C_p(m, n) \right] \quad (15)$$

Figure 8:
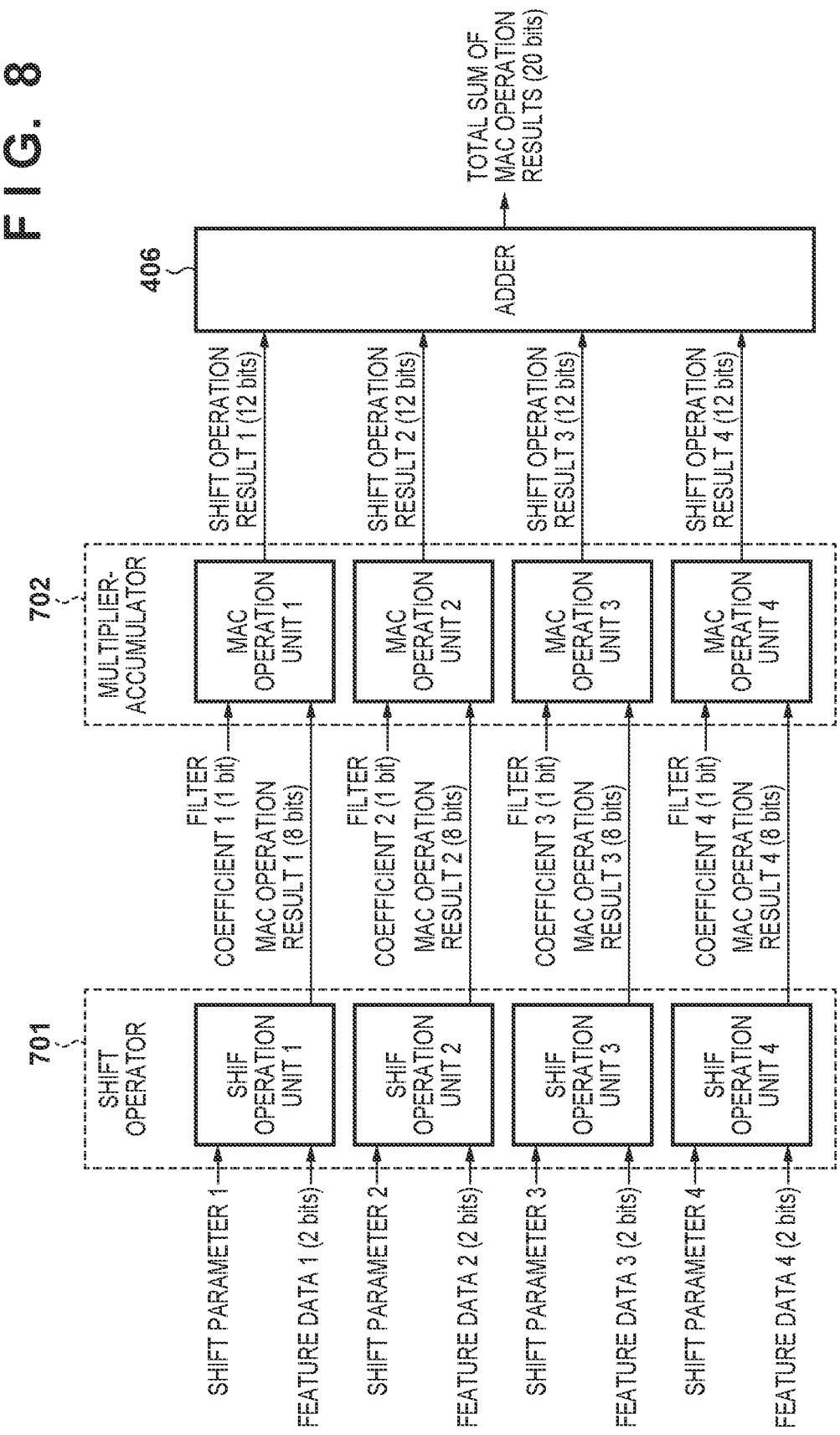
FIG. 8 is a block diagram showing an example of the arrangement of a multiplier-accumulator 702 and a shift operator 701.

FIG. 8 shows an example of a case in which P=4, β=8, and α=2. The bit width of the input data for the shift operator 701 is 2 bits, and the bit width of the input data for the multiplier-accumulator 702 is 8 bits, and the bit width of the input data for an adder 406 is 12 bits. Since the circuit scale of the shift operator 701 and the circuit scale of the multiplier-accumulator 702 are different due to the difference in the bit widths, it is possible to reduce the overall circuit scale by switching the order of the shift operator 701 (shift operator 403) and the multiplier-accumulator 702 (multiplier-accumulator 402).

Third Embodiment

The first and second embodiments described an example in which the bit widths of input feature data are α bits (the bit width of each MAC operation unit) and β bits (the product of the bit width of each MAC operation unit and the number of MAC operation units). However, the present invention is not limited to these, and bit widths other than α and β may be used.

<Case in which Bit Width of Input Feature Data is γ Bits>

Input feature data whose bit width is γ bits can be processed in this embodiment. FIG. 10C shows an example in which the feature data is 4 bits. In a case in which the feature data is 4 bits, a multiplier-accumulator 402 divides each of two sets of 4-bit feature data 1003 (values: 10, 14) by 2 bits as shown in FIG. 10C. The multiplier-accumulator 402 uses the four sets of 2-bit data (values: 2, 2, 2, 3) obtained by the division and two filter coefficients to calculate four MAC operation results. A shift operator 403 shifts the four MAC operation results based on two shift parameters. An adder 406 adds the four shifted MAC operation results to calculate one set of feature data (the total sum of the MAC operation results of two sets of 4-bit input feature data). In this manner, a data processing unit 305 can process two sets of 4-bit input feature data in parallel. γ is the bit width of the input feature data, and the value of γ differs from the value of β. The definitions of α, β, and P are the same as in the first embodiment, and γ, α, and P' satisfy the following condition.

$$\gamma = \alpha \times P'  \quad (16)$$

where γ is smaller than β, and P is a multiple of P'. In a case in which the bit width of input feature data I'$_{(\gamma)}$ is γ bits, output data O(n) of the adder 406 is expressed as equation (17) below based on the premise of equations (18), (19), and (20). The MAC operation result O(n) of an n-th output feature image is given by $$O(n) = \sum_{m=1}^{\frac{MP}{P}} \sum_{q=1}^{\frac{P}{P'}} \sum_{p=1}^{P'} [(I_{(\alpha),p,q}(m) \times C_{p,q}(m,n)) \times 2^{S(p,q)}] \quad (17)$$

where $I_{(\alpha), p}(m)$ is the input data of the α-bit data MAC operation unit, $C_p(m, n)$ is a filter coefficient, and S(p) is a shift parameter. A variable m is the number (the processing number of the multiplier-accumulator 402) of an α-bit input feature image group (1 group=P images). The MAC operation units are divided into P/P' sets and the shift operation units are divided into P/P' sets, and a variable q is a set number of the MAC operation unit. A variable p is the MAC operation unit number and the shift operation unit number in the set, and a variable n is the output feature image number. The shift operation is expressed by processing by the power of 2.

A filter coefficient $C_{p, q}(m, n)$ is a filter coefficient C'((m−1)×P/P'+q, n) corresponding to an {(m−1)×P/P'+q}-th γ-bit feature image. The filter coefficient is calculated based on the set number q of the MAC operation unit. Since a part of the filter coefficient is shared, the number of filter coefficients to be supplied in parallel to the P MAC operation units is P/P' and the transfer count is P/P'.

$$C_{p,q}(m,n) = C'((m-1) \times P/P' + q, n) \quad (18)$$

In this case, the input feature data I'$_{(\gamma)}$ is divided into P' sets of α-bit data $I_{(\alpha),p}(m)$. A shift parameter S(·) is calculated based on the bit width α of the MAC operation unit and the MAC operation unit number p.

$$S(p,q) = \alpha \times (p-1) \quad (19)$$

The γ-bit input feature data I'$_{(\gamma)}$ is expressed by the divided P' sets of α-bit data $I_{(\alpha),p,q}(m)$.

$$\sum_{p=1}^{P'} (I_{(\alpha),p,q}(m) \times 2^{S(p,q)}) = I_{(\gamma)}\left((m-1) \times \frac{P}{P'} + q\right) \quad (20)$$

A substitution of equations (18), (19), and (20) into equation (17) yields the equation of the output data O(n) as $$O(n) = \sum_{m=1}^{\frac{MP}{P}} \sum_{q=1}^{\frac{P}{P'}} \sum_{p=1}^{P'} [(I_{(\alpha),p,q}(m) \times C_{p,q}(m,n)) \times 2^{\alpha \times (p-1)}]$$

$$= \sum_{m=1}^{\frac{MP}{P}} \sum_{q=1}^{\frac{P}{P'}} \left[ I_{(\gamma)}\left((m-1) \times \frac{P}{P'} + q\right) \times C'\left((m-1) \times \frac{P}{P'} + q, n\right) \right] \quad (21)$$

By setting the value of the shift parameter S(p, q) and the number of filter coefficients, the feature data I'$_{(\gamma)}$ whose bit width is γ bits can be processed by using the same operators (the multiplier-accumulator 402, the shift operator 403, and the adder 406) as in the first embodiment.

<Processing Example of Case with Different Bit Widths>

FIGS. 5 and 10C show an example of an arrangement when P=4, β=8, and α=2, and FIGS. 6A to 6C show an example of the processing time when the processing target network shown in FIG. 2 is processed by using the hardware arrangement shown in FIG. 5.

FIGS. 6C and 10C show an example of a case in which P'=2 and γ=4, and a layer 3 (4-bit data, the number M of input feature images=4) is processed. Each of feature data I'$_{(4)}$(1) and I'$_{(4)}$(2) of feature images (3, 1) and (3, 2) is 4 bits, and four sets of data $I_{(2), 1}(1)$ to $I_{(2), 4}(1)$ divided based on equation (20) are input to the multiplier-accumulator 402. The shift operation results are calculated by using the input feature data, the shift parameter, and a filter coefficient C(m, n), the calculated shift operation results are input to the adder 406, and an initial value of zero is added to the calculated results. The calculation result becomes the shift operation result and is held by the adder 406. The duration of the process is 1 ms.

Each of feature data I'$_{(4)}$(3) and I'$_{(4)}$(4) of feature images (3, 3) and (3, 4) is 4 bits, and four sets of data $I_{(2), 1}(2)$ to $I_{(2), 4}(2)$ divided based on equation (20) are input to the multiplier-accumulator 402. The shift operation results are calculated by using the input feature data, the shift parameter, and a filter coefficient C(m, n), the calculated shift operation results are input to the adder 406, and the results are added to the preceding result. The duration of the operation is 1 ms. Finally, the feature data of a feature image (4, 1) is output via the processing unit 407. The processing time of four feature images is 2 ms.

In this manner, the embodiment is advantageous in that it is highly flexible since feature data other than data whose bit width is α bits (the bit width of each MAC operation unit) or β bits (the product of the bit width α of each MAC operation unit and the number P of MAC operation units) can be processed.

Fourth Embodiment

Although the first embodiment described an example in which activation processing is executed by a processing unit 407, the execution of the activation processing is not limited to the processing unit 407, and it may be set so that another device, for example, a CPU 306 will execute the activation processing. This is also similarly applicable to other processing operations, and the above embodiments have shown merely an example of the main body of various kinds of processing, and a main body different from the main body described in the above embodiments may be used.

In addition, activation/pooling processing was executed in accordance with the layer information in the first embodiment. However, the activation/pooling processing may be omitted depending on the case.

Also, although the first to third embodiments described a case in which the filter size (the height and the width of each filter) is 1×1, the filter size is not limited to 1×1 and may be another size. The numerical values used in the description of the above embodiments are merely examples used to make a more specific explanation and are not intended to limit the numerical values to be used to those described in the above embodiments.

In a case in which the filter size is small, there is an advantage in that the capacity of a memory (a coefficient memory 404 or 703) for holding filter coefficients can be made smaller. The minimum value to be set as the filter width and the filter height is 1.

Also, the first to third embodiments set the number of input feature images to be M and the number of output feature images to be N. However, numerical values applicable to M and N are not limited to specific numerical values. In this manner, the numerical values applicable to various kinds of variables described above are not limited to specific numerical values.

In addition, although the filter coefficients were held in the coefficient memory 404 or 703 and the feature data were held in a data memory 401 in the first to third embodiments, the memories for holding the filter coefficients and the feature data are not limited to specific memories. For example, the filter coefficients and the feature data may be held in a memory included in a multiplier-accumulator 402 or 702 or may be held in a RAM 308.

In addition, the bit width of each filter coefficient is not limited to a specific bit width. Furthermore, although CNN has been used as the processing target network in the first to third embodiments, the processing target network is not limited to CNN and may be a network to which a plurality of other kinds of layers are hierarchically connected such as RNN, MLP (multilayer perceptron), or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188612, filed Oct. 3, 2018, which is hereby incorporated by reference herein in its entirety.

What is claimed is:

1. An information processing apparatus, comprising:
one or more circuits, wherein the one or more circuits function as:
a plurality of multiply units configured to execute multiply operations on a plurality of data and a plurality of filter coefficients of a layer of a network including a plurality of layers;
a plurality of shift operation units configured to shift a plurality of multiply operation results obtained by the plurality of multiply units by multiplying respective multiply operation results by a power of 2 based on shift amounts;
a control unit configured to set the shift amounts corresponding to the plurality of shift operation units based on digits in input data and a bit width of the input data, for respective layers of the network; and
an adding unit configured to calculate a total sum of the plurality of multiply operation results shifted by the plurality of shift operation units,
wherein a number of the plurality of multiply units corresponds to a number of the plurality of shift operation units.

2. The apparatus according to claim 1, wherein the plurality of multiply units executes the multiply operations for each of the plurality of layers on the same circuit.

3. The apparatus according to claim 2, wherein the plurality of multiply units sequentially executes the multiply operations for each of the plurality of layers on the same circuit.

4. The apparatus according to claim 3, wherein the control unit sets the shift amount for each layer to be processed.

5. The apparatus according to claim 1, wherein the plurality of layers include two or more layers that process data sets having different bit widths with each other.

6. The apparatus according to claim 1, wherein the control unit switches a transfer count of the filter coefficients in accordance with the bit width of the data of the layer.

7. The apparatus according to claim 1, wherein the plurality of shift operation units shift the plurality of multiply operation results based on a plurality of shift amounts.

8. The apparatus according to claim 1, wherein the plurality of multiply units and the plurality of shift operation units operate in parallel.

9. The apparatus according to claim 1, wherein the adding unit stores, as data of a layer succeeding a predetermined layer, the total sum for each point and each feature of the predetermined layer in a memory.

10. The apparatus according to claim 1, further comprising an activation unit configured to perform activation processing on the total sum for each point and each feature.

11. The apparatus according to claim 10, further comprising a pooling unit configured to perform pooling processing on a result of the activation processing.

12. The apparatus according to claim 11, wherein the pooling unit stores, as data of a layer succeeding a predetermined layer, a result obtained by performing the pooling processing on the predetermined layer in a memory.

13. The apparatus according to claim 9, further comprising:
a unit configured to execute at least one of image processing and image recognition on each frame of a moving image based on the data stored in the memory.

14. The apparatus according to claim 1, wherein the network has a different data bit width for each layer.

15. The apparatus according to claim 1, wherein the bit width of the input data is 2 bits, 4 bits, or 8 bits.

16. An information processing method for an information processing apparatus having one or more circuits functioning as a plurality of multiply units and a plurality of shift operation units, the method comprising:
executing multiply operations on a plurality of data and a plurality of filter coefficients of a layer of a network including a plurality of layers;
shifting a plurality of multiply operation results obtained by the plurality of multiply units by multiplying respective multiply operation results by a power of 2 based on shift amounts;
setting the shift amounts corresponding to the plurality of shift operation units based on digits in input data and a bit width of the input data, for respective layers of the network; and
calculating a total sum of the plurality of multiply operation results shifted by the plurality of shift operation units,
wherein a number of the plurality of multiply units corresponds to a number of the plurality of shift operation units.

17. A non-transitory computer-readable storage medium storing a computer program for causing a computer to function as:
a plurality of multiply units configured to execute multiply operations on a plurality of data and a plurality of filter coefficients of a layer of a network including a plurality of layers;
a plurality of shift operation units configured to shift a plurality of multiply operation results obtained by the plurality of multiply units by multiplying respective multiply operation results by a power of 2 based on shift amounts;
a control unit configured to set the shift amounts corresponding to the plurality of shift operation units based on digits in input data and a bit width of the input data, for respective layers of the network; and
an adding unit configured to calculate a total sum of the plurality of multiply operation results shifted by the plurality of shift operation units,
wherein a number of the plurality of multiply units corresponds to a number of the plurality of shift operation units.

18. The apparatus according to claim 1, wherein the multiply units further execute an accumulate operation.

19. The apparatus according to claim 1, wherein each of the shift amounts is different from each other for respective positions of digits in the data.

20. The apparatus according to claim 1, wherein a bit width of data on which the multiply operation is executed by respective multiply units is shorter than a bit width of the input data.

21. An information processing apparatus, comprising:
one or more circuits, wherein the one or more circuits function as:
a plurality of operation units configured to
multiply a plurality of data and a plurality of filter coefficients of a layer of a network including a plurality of layers without bit shifting the plurality of data before a sum of operation results of the plurality of operation units is calculated, in a case where a bit width of data input to the layer is the same as a bit width of the operation units, and
multiply the plurality of data and the plurality of filter coefficients of the layer of the network including the plurality of layers with bit shifting the plurality of data based on shift amounts before the sum of operation results of the plurality of operation units is calculated, in a case where a bit width of the data input to the layer is a multiple of the bit width of the operation units, wherein the data input to the layer is divided into the plurality of data; and
a control unit configured to set the shift amounts based on digits in the data input to the layer for respective layers of the network.

22. The apparatus according to claim 21, wherein
the plurality of operation units are configured to shift multiply operation results of the plurality of operation units by a power of 2 based on the shift amounts.

23. The apparatus according to claim 21, wherein
the plurality of operation units are configured to shift the plurality of data by multiplying respective pieces of the plurality of data by a power of 2 based on the shift amounts.

24. The apparatus according to claim 21, wherein the filter coefficient is 1-bit data and the multiply operations are 1-bit operations.

25. The apparatus according to claim 21, wherein the plurality of operation units includes multipliers and a corresponding number of shift operators, and
multiply operation results of the multipliers are input to the shift operators.

26. The apparatus according to claim 21, wherein the plurality of operation units includes multipliers and a corresponding number of shift operators, and
shift operation results of the shift operators are input to the multipliers.

27. The apparatus according to claim 21, wherein a bit width of data to be operated on by the plurality of operation units is different for each layer of the network.

28. The apparatus according to claim 21, wherein the plurality of operation units are configured to perform an operation of data divided in a unit of 2 bits.

29. The apparatus according to claim 21, wherein the sum of operation results is stored into a memory.

30. The apparatus according to claim 29, further comprising a recognition unit configured to perform an image recognition process of an image based on data stored in the memory.

31. The apparatus according to claim 25, wherein a bit width of a shift operation result of the shift operators is the same as the bit width of the data input to the layer.

32. An information processing method comprising:
multiplying a plurality of data and a plurality of filter coefficients of a layer of a network including a plurality of layers without bit shifting the plurality of data before a sum of operation results of a plurality of operation units is calculated, in a case where a bit width of data input to the layer is the same as a bit width of the operation units;

multiplying the plurality of data and the plurality of filter coefficients of the layer of the network including the plurality of layers with bit shifting the plurality of data based on shift amounts before the sum of operation results of the plurality of operation units is calculated, in a case where a bit width of the data input to the layer is a multiple of the bit width of the operation units, wherein the data input to the layer is divided into the plurality of data; and setting the shift amounts based on digits in the data input to the layer for respective layers of the network.

33. A non-transitory computer readable storage medium storing a program for causing a computer to perform a method, wherein the method comprises:

multiplying a plurality of data and a plurality of filter coefficients of a layer of a network including a plurality of layers without bit shifting the plurality of data before a sum of operation results of a plurality of operation units is calculated, in a case where a bit width of data input to the layer is the same as a bit width of the operation units;

multiplying the plurality of data and the plurality of filter coefficients of the layer of the network including the plurality of layers with bit shifting the plurality of data based on shift amounts before the sum of operation results of the plurality of operation units is calculated, in a case where a bit width of the data input to the layer is a multiple of the bit width of the operation units, wherein the data input to the layer is divided into the plurality of data; and setting the shift amounts based on digits in the data input to the layer for respective layers of the network.

* * * * *